INVENTOR.
Louis M. Porter

Feb. 18, 1964     L. M. PORTER     3,121,509
DAMAGE RESISTANT RUPTURE DISC ASSEMBLY
Filed Sept. 19, 1960     2 Sheets-Sheet 2

INVENTOR
Louis M. Porter
BY
Hovey, Schmidt, Johnson & Hovey
ATTORNEYS.

United States Patent Office 3,121,509
Patented Feb. 18, 1964

3,121,509
DAMAGE RESISTANT RUPTURE DISC ASSEMBLY
Louis M. Porter, Independence, Mo., assignor to Fike
Metal Products Corp., Blue Springs, Mo., a corporation
of Missouri
Filed Sept. 19, 1960, Ser. No. 56,841
1 Claim. (Cl. 220—89)

This invention relates to safety pressure devices, frequently referred to as safety heads, which are used in the protection of pressure vessels and various other equipment wherein dangerous fluid pressures may occur. Such a device includes a dome-shaped, frangible diaphragm, commonly referred to as "rupture disc," designed to rupture at a predetermined positive pressure differential of the fluid within the system to which the diaphragm is coupled. Diaphragms of this character are usually positioned between the high and low pressure sides of the system, with the high pressure acting upon the concave side of the diaphragm, so that should the pressure rise toward the danger point, the diaphragm ruptures at the predetermined pressure for which it is designed, thereby relieving the excessive pressure in the system.

In systems where the fluid pressure on the concave side of the diaphragm falls below the pressure on the convex side thereof, such as during cycling pressure and vacuum service, it has been found advantageous to utilize a concavo-convex, diaphragm-supporting member in complementally seated engagement with the concave side of the diaphragm to permit the latter to rupture responsive to a positive pressure differential for which it is designed, but to prevent the diaphragm from buckling and distorting inwardly responsive to a negative pressure differential.

Although the use of such a diaphragm-supporting member with a diaphragm of the character described, is completely satisfactory for a wide range of applications, it has been determined that, for a number of specific operating conditions, it is necessary that the diaphragm be, at all times, in substantial contact with the diaphragm-supporting member and that the convex surface of the diaphragm be protected from damage done thereto by the means securing the diaphragm to the pressure system to thereby offset fatigue of the material forming the diaphragm.

It is, therefore, the most important object of this invention to provide a safety device of the aforementioned character which includes means for maintaining the diaphragm in substantial engagement with the diaphragm-supporting member at all times, so that the diaphragm will rupture precisely at the pressure for which it is designed.

Another important object of this invention is to provide means on a safety device of a pressure system including a frangible diaphragm adapted to rupture at a specific positive pressure differential for protecting the surface of the diaphragm from damage done thereto by the means mounting said diaphragm on the system, to thereby minimize fatigue effects of the material forming the diaphragm so that the latter will rupture at the pressure for which it is designed.

A further object of this invention is to provide means as above described which overlie the entire convex surface of the diaphragm to protect the latter against damage by foreign objects so that the diaphragm will be protected against weakening which would cause the same to rupture at a pressure less than that at which it was designed to rupture.

Yet another object of this invention is to provide means as above described, further provided with a central rupture area, permitting said means to rupture with said diaphragm so that said diaphragm will rupture at the pressure at which it was designed to rupture.

Still another object of this invention is the provision of a continuous band adapted to engage an annular portion of a frangible, concavo-convex diaphragm of a pressure system and disposed between the convex surface of the diaphragm and the means mounting said diaphragm on said system to prevent damage to the convex surface when said diaphragm is secured to the system by the mounting means.

Other important objects of this invention will be recognized and become apparent as the following specification progresses.

Figure 1:
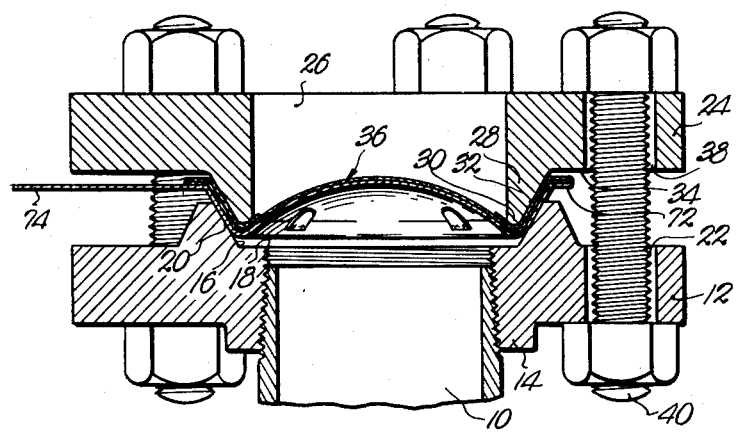
FIGURE 1 is a side elevational view of a rupture disc assembly made pursuant to the present invention, illustrating the manner in which the same is mounted on a pressure vessel or the like, parts being broken away and in section for clearness.

The safety device includes a nipple 10 adapted for connection with a high pressure vessel (not shown), and externally threaded on its upper end to secure a ring-shaped seat or clamping ring 12. The ring 12 has a depending, internally threaded flange 14 for engaging the threads of the nipple 10, and a peripheral seat 16, formed in the upper face of ring 12, has a horizontal portion 18 terminating in an upwardly inclined, annular wall 20. Ring 12 extends radially beyond seat 16 and is provided with a series of openings 22.

Associated with seat 16 is a clamping ring 24 having a vertical inner wall 26 aligning with nipple 10 and having a depending, annular clamping or rib portion 28. Clamping portion 28 of ring 24 corresponds in shape to seat 16, and includes a rounded portion 30 and an annular, inclined face portion 32 having substantially the same angle of inclination as that of annular wall 20 of ring 12. From the clamping portion 28, the lower face of ring 24 is recessed, as at 34, to provide clearance for the surplus material of rupture disc assembly 36, disposed between rings 12 and 24 and hereinafter described. Ring 24 is also provided with openings 38 aligned with openings 22 in ring 12, through which fasteners, such as bolts 40, may be projected to clamp rings 12 and 24 together and to clamp rupture disc assembly 36 in place.

Rupture disc assembly 36 is comprised of a frangible, concavo-convex diaphragm 42, a diaphragm-supporting device 44, and an annular element 46 engaging the convex surface of diaphragm 42 for a purpose hereinafter described.

Diaphragm 42 is provided with an annular flange 48 integral therewith at the peripheral edge 50 thereof, and it is noted that flange 48 extends from edge 50 in a reverse curve from that of the frangible, dome-shaped portion of diaphragm 42, and thence outwardly in a plane substantially parallel with seat 16 of ring 12. Diaphragm 42 normally closes the relief opening formed by the inner diameters of rings 12 and 24, and is adapted to fracture in case of excessive pressure within the vessel to which nipple 10 is connected.

Figure 3:
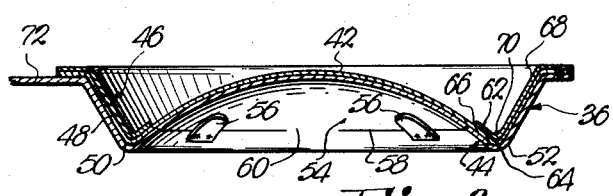
FIG. 3 is a side elevational view taken along line 3—3 of FIG. 2.
Figure 2:
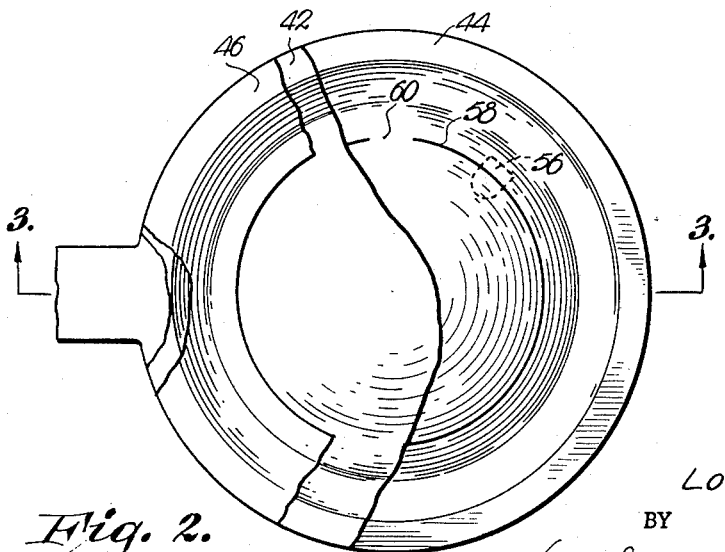
FIG. 2 is a plan view of the rupture disc assembly, parts being broken away for clearness.

If the vessel connected to nipple 10, is subjected to a greater pressure on the convex side of diaphragm 42 than the pressure on the concave side of the latter, diaphragm 42 tends to buckle inwardly and to become distorted so as to change the pressure and rupturing characteristics thereof, and in order to overcome this action, supporting device 44 is disposed on the concave side of diaphragm 42 to sustain the latter. Device 44 is comprised of an annulus 52 and a concavo-convex member 54 that is complemental with the shape of diaphragm 42 and adapted to seat within the concave face of the latter, as is clear in FIG. 3.

Member 54, which is surrounded by annulus 52, is supported in engagement with diaphragm 42 through the provision of parts on annulus 52 taking the form of a plurality of ears 56 secured to annulus 52. Ears 56 are welded directly to annulus 52, but may be attached thereto in any other suitable manner. Annulus 52 engages flange 48 of diaphragm 42 and takes the shape of the latter to support the same when assembly 36 is disposed between rings 12 and 24.

In order to provide for relief of pressure without destructive reactions to the vessel and hazards caused by wildly flying fragments of the safety device after it has ruptured, member 54 is preferably hinged to annulus 52 in some suitble manner, so that when the internal pressures exceed the predetermined value in relation to the external pressure, diaphragm 42 will rupture to allow central relief of pressure through opening 26 and member 54 will swing away from ears 56 to a position clearing the relief opening. To provide this hinge action, an arcuate slot 58 is provided in device 44, setting off member 54 from annulus 52 and presenting a line of bend 60 between the ends of slot 58. It is to be preferred that slot 58 be substantially larger than a semicircle, so that member 54 will swing on line 60 in hinge-like manner substantially clear of the relief opening. Accordingly, ears 56 are disposed to traverse slot 58, as is clear in FIG. 3. It is apparent that member 54 is restrained from swinging movement about line 60 away from diaphragm 42 by ears 56, so that member 54 remains in seated engagement with the concave side of diaphragm 42 to thereby prevent the latter from buckling and distorting.

Element 46 is comprised of a continuous band 62 engaging an annular portion 64 of diaphragm 42 on the convex side of the latter, to maintain member 54 in substantial engagement with the concave side of diaphragm 42 when assembly 36 is disposed between rings 12 and 24. Band 62 is provided with a continuous inner edge 66 presenting an opening therethrough for receiving the dome-shaped portions of diaphragm 42 and device 44. It is noted that edge 66 is disposed on annular portion 64 intermediate edge 50 of diaphragm 42, and a line on the latter corresponding to the outward projection thereon of slot 58, so that when the design pressure of diaphragm 42 is reached, member 54 is permitted to swing in the direction of diaphragm 42 about line 60 and is thereby not restrained by band 62. An annular flange 68 is secured to band 62 at the outer extremity 70 of the latter and engages flange 48 of diaphragm 42 on the side opposite to that engaged by annulus 52.

When rupture disc assembly is disposed between rings 12 and 24, and the latter are clamped together, face portion 32 of ring 24 engages the outer surface of flange 68 integral with band 62 and wall 20 of ring 12 engages the outer surface of annulus 52. Rounded portion 30 of ring 24 is thereupon substantially seated in the junction between band 62 and flange 68 so that the stresses created by the clamping action of rings 12 and 24, is uniformly distributed over annular portion 64 of diaphragm 42 by virtue of being in contact with band 62. Distributing the stresses in this manner prevents the fatigue of the material forming diaphragm 42 to thereby increase the useful life thereof. Although it is contemplated that element 46 be of a suitable metallic material, it is conceivable that the same may be formed from any rigid material capable of distributing the clamping stresses described above.

It is noted that the lateral projections 72 of flange 48, annulus 52, and flange 68, form no part of the instant invention and the extension 74 on annulus 52, also is not essential to the operation of assembly 36, extension 74 being utilized for the purpose of presenting a name plate for assembly 36.

It is clear that with the construction of assembly 36 as shown in the drawings, diaphragm 42 remains out of substantial contact with rings 12 and 24 so as to effectively protect the concave and convex sides thereof from damage done thereto by contact with rings 12 and 24. Although device 44 has been shown to protect the concave side of diaphragm 42, as well as to support the latter, it is contemplated that a second element similar to element 46, may be disposed on the concave side of diaphragm 42 and having a flange in engagement with flange 48 of diaphragm 42 to protect the concave surface of the latter, and to maintain diaphragm 42 out of substantial contact with rings 12 and 24.

In the preferred construction, the outer annular flanges of element 46, diaphragm 42 and device 44, are spot-welded or otherwise fastened together so that the unit is distributed in assembled condition. Thus, the device 44, as well as the element 46, serve to protect the central section of diaphragm 42 against damage during transportation and subsequent handling thereof. This feature is particularly important where the diaphragm 42 is constructed of relatively lightweight, easily ruptured, creased or perforatable material such as plastic or thin aluminum sheet.

Figure 4:
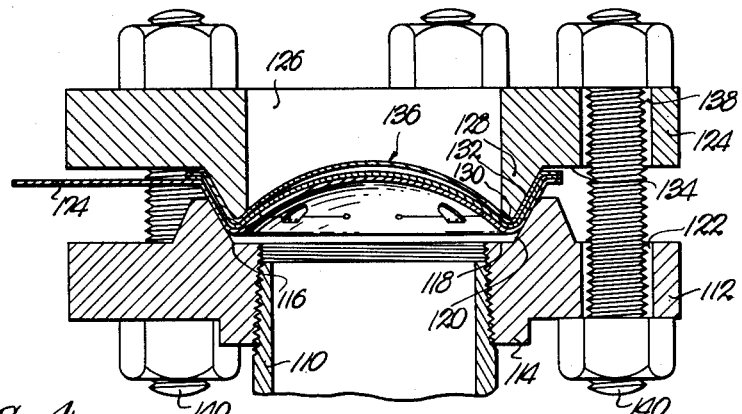
FIG. 4 is a view similar to FIG. 1, showing a second embodiment of the present invention.
Figure 5:
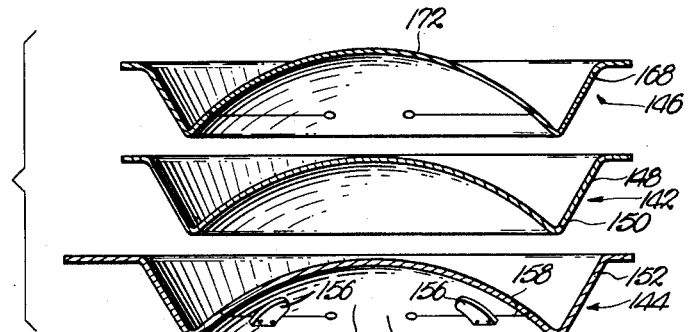
FIG. 5 is an exploded view of the rupture disc assembly of FIG. 4.
Figure 6:
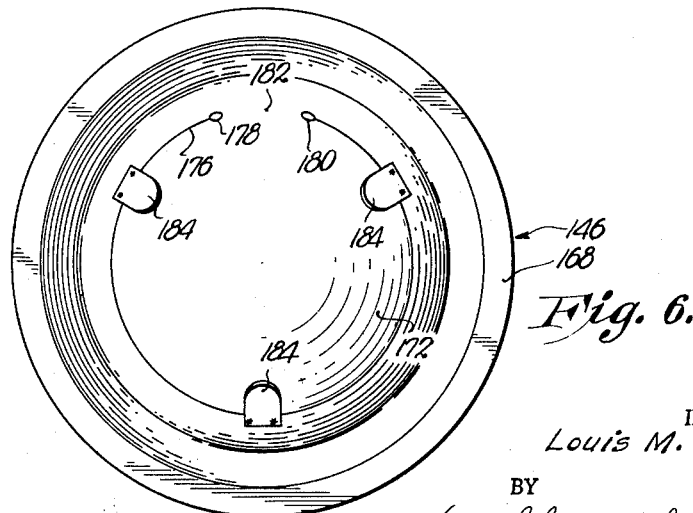
FIG. 6 is a top plan view of the uppermost disc in FIG. 5.

A second embodiment is illustrated in FIGS. 4 through 6, wherein like structure is denoted by similar numbers in the 100 series. In this embodiment, the element 146 includes an annular flange 168 integral with, and surrounding a hemispherically-shaped dome center 172. Dome center 172 overlies the convex surface of diaphragm 142, but touches the diaphragm only at the intermediate edge 150, the central dome-shaped portion 172 being spaced slightly from the central dome-shaped portion of the diaphragm 142.

Element 146 is further provided with a slot 176 similar to the slot 58 of the support 44 of the previously described embodiment of assembly 36. Slot 176 is generally arcuate and greater than a semicircle, and has angularly-spaced ends 178 and 180 defining a line of bend 182. A plurality of angularly-spaced ears 184 are provided on the upper surface of dome-shaped central portion 172 of element 146, which are fastened to the element 146 on the radially outward side of slot 176, such as by welding or other suitable fastening means, and ears 184 extend transversely across slot 176.

It will, therefore, be obvious that element 146 provides all of the advantages of element 46, and in addition, provides a protective covering for the dome-shaped central portion of diaphragm 142 which will protect the diaphragm from injury by foreign objects when the same would otherwise be exposed to atmosphere. Such construction prevents weakening of the diaphragm 142, due to injury by foreign objects which might otherwise weaken the diaphragm and permit the same to rupture at a pressure less than the pressure at which it was designed to rupture.

The construction of the element 146 in addition, is similar to the construction of support 46 in providing a flap which will permit the normal rupture of diaphragm 142 when the pressure differential is reached at which the diaphragm is designed to rupture. At the same time, the ears 184 provide sufficient support to prevent dome 172 from opening by bending along line of bend 182 prior to the time that the required pressure differential is reached so that the protection of the diaphragm is insured.

Having thus described the invention, what is claimed as new and desired to be secured by Letters Patent is:

In a safety device for pressure systems having a relief opening, the combination of a frangible, concavo-convex rupture disc having a central dome-shaped portion with a peripheral edge therearound and responsive to pressure and suctions thereon; a diaphragm-supporting device having an arcuate slot therein around a substantial portion of the circumference thereof and presenting a rigid, concavo-convex member and a rigid annulus surrounding the member and integrally joined thereto along a relatively narrow, single line of bend between the ends of the slot for swinging movement of the member relative to the annulus on said line of bend, the convex side of said member being disposed in complementally seated engagement with said rupture disc on the concave side of the latter; a plurality of inwardly extending ears on the annulus traversing the slot and engaging the member on the concave side thereof to prevent swinging movement of said member about said line away from said rupture disc; a rigid annular element comprising a continuous band provided with an inner circular edge defining an opening, and a side presenting a surface in seated, mated engagement with the convex side of an annular portion of said rupture disc proximal to said peripheral edge in overlying complemental relationship thereto to maintain said rupture disc in substantial engagement with said member, said element extending radially inwardly of said annular portion into overlying partial protecting relationship with the dome-shaped portion of said disc with said circular edge in substantial alignment with said arcuate slot and said dome-shaped portion of the rupture disc projecting through said opening; means securing said disc, said device, and said element together to form a monolithic unit; and means for rigidly mounting said rupture disc, said device and said element in a location to dispose said rupture disc across said opening in sealed relationship thereto.

References Cited in the file of this patent

UNITED STATES PATENTS

| | | |
|---|---|---|
| 2,548,744 | Simms | Apr. 10, 1951 |
| 2,716,506 | Fike | Aug. 30, 1955 |
| 2,766,904 | Philip | Oct. 16, 1956 |
| 2,875,921 | Coffman | Mar. 3, 1959 |
| 2,953,279 | Coffman | Sept. 20, 1960 |
| 2,954,897 | Hansen | Oct. 4, 1960 |